(12) United States Patent
Park et al.

(10) Patent No.: US 8,850,513 B2
(45) Date of Patent: Sep. 30, 2014

(54) SYSTEM FOR DATA FLOW PROTECTION AND USE CONTROL OF APPLICATIONS AND PORTABLE DEVICES CONFIGURED BY LOCATION

(75) Inventors: Juha Park, Gyeonggi-do (KR); Vinicius Stradiotto Farbiarz Marcus, Campinas-SP (BR); Euler Mendes Rachid, Campinas-SP (BR); Felipe Augusto Pereira de Figueiredo Figueiredo, Santa Rita Do Sapucai-MG (BR); Luiz Gustavo De Silva Ywata, Campinas-SP (BR); Glauco Barroso Junquera, Campinas-SP (BR); Rodrigo Rafael Santos Costa Chiossi, Piracicaba-SP (BR); Guilherme Augusto Kusano Schnick, Campinas-SP (BR)

(73) Assignee: Samsung Electronics Co., Ltd., Suwon-Si (KR)

(*) Notice: Subject to any disclaimer, the term of this patent is extended or adjusted under 35 U.S.C. 154(b) by 44 days.

(21) Appl. No.: 13/339,048

(22) Filed: Dec. 28, 2011

(65) Prior Publication Data

US 2013/0174210 A1    Jul. 4, 2013

(51) Int. Cl.
| | | |
|---|---|---|
| *G06F 17/00* | (2006.01) | |
| *H04L 29/06* | (2006.01) | |
| *G06F 7/04* | (2006.01) | |
| *G06F 17/30* | (2006.01) | |
| *G06F 15/16* | (2006.01) | |
| *G06F 21/53* | (2013.01) | |

(52) U.S. Cl.
CPC .............. *H04L 63/107* (2013.01); *G06F 21/53* (2013.01)
USPC ........................... 726/1; 726/2; 726/3; 726/4

(58) Field of Classification Search
CPC ....... H04L 63/107; H04L 63/20; G06F 21/53; G06F 21/554
USPC ................................................ 726/1, 2, 3, 4
See application file for complete search history.

(56) References Cited

U.S. PATENT DOCUMENTS

| | | | | |
|---|---|---|---|---|
| 7,594,259 | B1 * | 9/2009 | Audet et al. ..................... | 726/11 |
| 2003/0097590 | A1 * | 5/2003 | Syvanne ........................ | 713/201 |
| 2011/0241872 | A1 * | 10/2011 | Mahaffey ................. | 340/539.13 |
| 2013/0094376 | A1 * | 4/2013 | Reeves ........................... | 370/252 |
| 2013/0097709 | A1 * | 4/2013 | Basavapatna et al. .......... | 726/25 |
| 2013/0116037 | A1 * | 5/2013 | Acres .............................. | 463/23 |
| 2013/0172014 | A1 * | 7/2013 | Kaul et al. ................. | 455/456.3 |

* cited by examiner

*Primary Examiner* — Kambiz Zand
*Assistant Examiner* — Benjamin Kaplan

(57) ABSTRACT

The present invention relates to a system for implementing a firewall service on portable devices such as mobile phones, tablets or notebooks, which has changed their security settings depending on the location where they are. More specifically, the invention relates to a method of protecting data flow and control of use of devices and functional applications present in a portable device and configured from their location.

15 Claims, 7 Drawing Sheets

SYSTEM FOR DATA FLOW PROTECTION AND USE CONTROL OF APPLICATIONS AND PORTABLE DEVICES CONFIGURED BY LOCATION

FIELD OF THE INVENTION

The present invention relates to a system for implementing a firewall service on portable devices such as mobile phones, tablets or notebooks, which has changed their security settings depending on the location where they are. More specifically, the invention relates to a method of protecting data flow and control of use of devices and functional applications present in a portable device and configured from their location.

BACKGROUND OF INVENTION

Typically, in a computer network, a firewall is a protection system implemented in hardware or software that regulates the data traffic between different networks and prevents transmitting and/or receiving inadequate access, unauthorized or harmful between a personal computer, a home or corporate network and an Internet connection.

The use of a firewall via hardware consists of installing an additional device located between the user's machine and internet access.

The use of a firewall via software consists of installing a program on the user's own machine, and the selection of content that may or may not travel through the firewall made by rules established by a network administrator who follows corporate policies defined by a company or even by the users of the machines connected to the network, that configure them according to their particular protection needs and control.

In the context of the present invention, any portable device that is able to connect to the Internet through a cable or wireless becomes a node in the network and therefore is likely to use a firewall for protection. In the case of wireless connections, the Internet connection can be made over Wi-Fi, Bluetooth, Zigbee, or through a cellular network using, for example, 2G, 3G or 4G technologies.

Today, devices connected to the Internet are subject to malicious attacks that search for vulnerabilities in the system in order to find some gap to make an invasion on the machine which may cause damage such as:

Files can be deleted or the storage media can be damaged occurring data loss;
By having access to the system, the attacker can view the contents of personal files and make use of this information that may be personal or confidential;
The system may be down, leaving it inoperable;
Improperly using the machine, which attributes to the operator the responsibility of the actions taken by the attacker;
Undesired data traffic, consuming bandwidth.

Moreover, every time a machine is attacked, the user will use spending and loss of time to repair the system. A device or subnet without the protection of a firewall does not offer to the user or to network administrator the possibility to select content that will traverse the network, increasing the chances of damage or inconvenience as mentioned before.

Some solutions are proposed in the art. However, none of them is capable of providing effective protection against the problems enumerated above.

The Brazilian patent application PI 0519544-6, published on Jun. 29, 2006, owner: QUALCOMM INCORPORATED, introduces the concept of a firewall installed on the remote data service provider (carrier) and dynamically configured by the mobile device, for example, whenever an incoming undesired connection is detected (passive socket) or when the user changes any of the local configuration settings. The problem solved by the method of the Brazilian document is to avoid wasting band, which happens to a local firewall, filtering out undesired packets, before they are sent to the mobile device, while decentralizing the configuration of remote firewall. Differently from the said document, in accordance with the present invention, a local firewall is proposed, in which data packets are filtered in the device itself and not by the service provider, making it independent of any external infrastructure. Another disadvantage presented by the solution presented by the Brazilian document PI 0519544-6 is that the Firewall does not change its behavior depending on the location of the mobile device or other connectivity factors (VPN, Wi-Fi), which is the main focus of the present proposed invention. Furthermore, this document PI 0519544-6 provides for updating firewall settings dynamically by the mobile device, whereas, according to the present invention, this may be configured in a centralized manner by a network administrator, locally by the user and in both cases, it depends on the policies defined from the location of the device.

The US patent document US 2008107068, published on May 8, 2008, owner: NTT DOCOMO, INC., is related to the Firewall configuration on a remote network that supports Mobile IP. In this particular case, the data targeted at mobile devices connected to the network are directed to a single Home Agent, which is responsible for redirecting the data packet to the correct mobile device. Depending on the network topography, different firewalls may be positioned between the mobile device and the Home Agent. The central concept of this document is to enable the configuration of these firewalls centrally (by the home agent), allowing different settings for the mobile device, while all firewalls will share the same configuration set per device. In contrast, the present invention proposes a Local Firewall implemented within the portable device. The problem to be solved by this document is to keep a unique configuration, regardless of the location of the mobile device, while the present invention aims to provide flexibility to change the current configuration of the firewall, according to their geographical location.

The US patent document US 2002/0166068, published on Nov. 7, 2002, is analogous to the document US 20081070682 previously discussed, the essential difference being the infrastructure that is involved. In accordance with the teachings of this document, the waste of bandwidth on the data link (remote firewall) is prevented and also promotes the possibility of different settings for each portable device connected to the network through the use of a central repository called "Wireless Internet Facility (WIF)", which stores the firewall configuration of each portable device. When the phone connects to a base station, it will search for the WIF firewall configuration of that specific device, will download and apply the firewall configuration until the device disconnects this base station. In contrast, these prior art approaches discussed so far, the present invention proposes a local Firewall. As the document US 2008107068, the document US 2002/0166068 solves the problem of maintaining a unique configuration regardless of the location of the mobile device, while the present invention aims to provide flexibility to change the current configuration of the firewall, according to their geographical location.

The Chinese patent document CN 200910091623.6, published on Jan. 27, 2010, owner: HUAWI TECH SHENZHEN CO., LTD. LTD uses GPS features and/or triangulation of the cellular network to detect the user's position and thus apply Firewall rule that is defined for that location. The Firewall is local and allows it to support multiple locations or locations with no defined rules. However, the Firewall in this Chinese document does not work with filter/lock of the data network. It acts only on the functionality of calling and text messaging of the phone. The patent also does not provide configuration done remotely by the administrator, but only by the phone user. Another drawback is the lack of control mechanisms of the phone devices, such as disabling USB, Bluetooth. Furthermore, Wi-Fi cannot be used to determine the user location.

The US patent document U.S. 2007/0067838, published on Mar. 22, 2007, relates to a Remote Firewall, where a list of policies (pinholes) is defined at the time of activation of the portable device on the network. Once the device connects to the network, the firewall configuration is loaded and synchronized over the network firewalls of mobile operator in question. This configuration has a list of static policies, or pinholes. In addition, this document includes the concept of a synchronization of Firewalls protocol and also the need to authenticate the phone to be able to change the list of dynamic policies, which can be updated by the portable device to include/Remove dynamic pinholes. In essence, despite some differences, that document US 2007/0067838 relates to more than one firewall installed on a phone network operator, which can be configured remotely by the portable device. In contrast, the present invention provides for the local implementation of the firewall on the device itself. In addition, the firewall of the present invention may have policies of different devices updated centrally by the network administrator, while the document US 2007/0067838 provides for the updating of policies by the portable device that uses them. Again, the main difference between this invention and this prior art is the ability to change the set of active configurations, according to the geographic location of the portable device.

SUMMARY OF THE INVENTION

It is an object of the present invention to provide a system in which rules and policies of a firewall implemented via software on a portable device to be enabled, disabled or changed automatically depending on the location, which can be defined from one geographic coordinate system or other reference systems. The geographical coordinates of the device can be obtained by means of GPS (Global Positioning System) integrated thereto, by triangulation of the base station with which the data network of the device is connected or by reference to a hotspot Wi-Fi.

Thus, the system of the present invention provides a solution to the problem of constant need to set a different set of rules for different places, because it is a desired a safety level specific to each environment where portable device is used. The firewall must have the ability to restrict the use of devices for data transmission when they are in a certain region, where data traffic should be controlled. Yet, the settings of firewall policies, which can be used to enable or disable features of the devices can be configured remotely.

BRIEF DESCRIPTION OF FIGURES

The objectives and advantages of the present invention will become more apparent from the following detailed description of an exemplary embodiment of the invention and the accompanying drawings by way of non-limitative example, wherein.

DESCRIPTION OF PREFERRED EMBODIMENTS OF THE INVENTION

Figure 1:
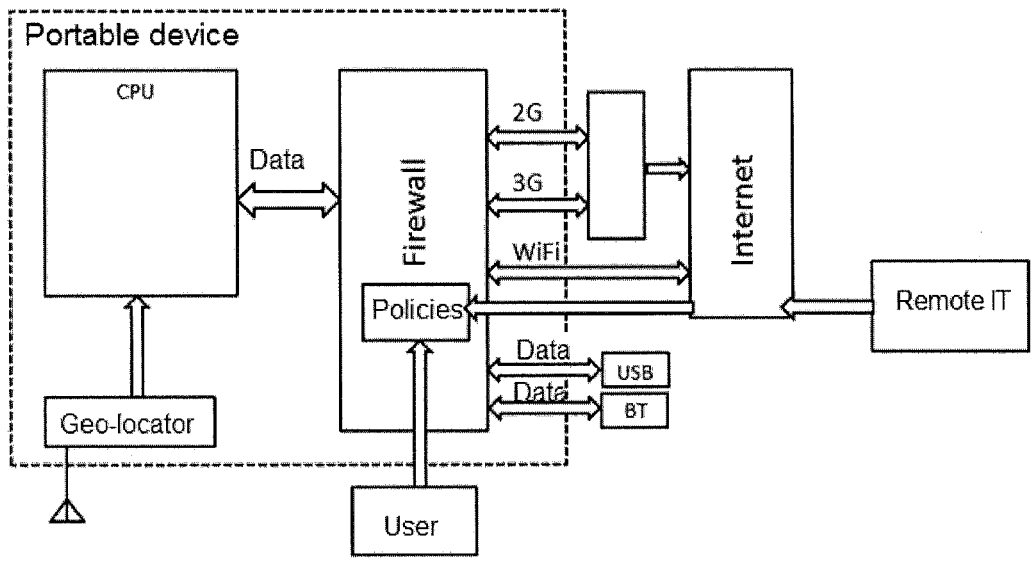
FIG. 1 presents an overview of the protection system data flow and control of use of applications and devices configured by location, according to the prior art.

FIG. 1 shows an overview of the data flow protection system and control of the use of applications and devices configured by location. All data flow from the device to the internet or coming from the same necessarily passes through a firewall with security policies that may have been configured by the user or remotely by a network administrator. The Internet connection can be made through 2G, 3G technologies and WiFi. The Internet access is accomplished through 2G and 3G connections and passes before by the cellular network. A Wi-Fi connection is established directly from the device to the Internet. The data transfer with external devices (such as Bluetooth or USB) may also be governed by security policies, as shown in FIG. 1.

Figure 2:
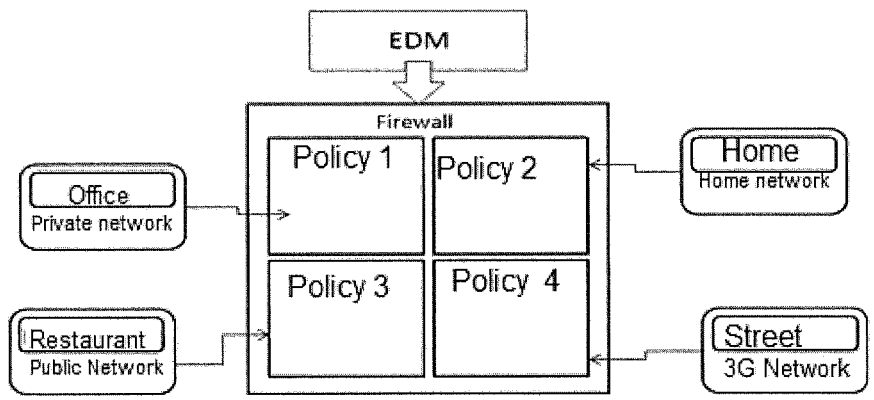
FIG. 2 illustrates the configuration of policies as use environment, according to the prior art.

FIG. 2 illustrates the behavior of the firewall with regard to changes of policy automatically configured depending on the location of the portable device. Normally, the location is related to the type of network that will connect the equipment. Example: Restaurants can offer open access to Wi-Fi to its clients. According to the location, the device recognizes this network as a public type network and then enable the rules that apply to this situation in the firewall.

Depending on the network where the device is, the user himself will be allowed to change the policy rules that were established, in others not. For example, in a domestic environment, the user itself can configure the firewall according to applications that are currently using. S/he can also release or not access of a particular application to the Internet to transmit information. In a business environment, it is a network administrator who has the power to configure the firewall to restrict user access to information not relevant to the workplace.

The present invention handles the implementing a firewall able to detect the location of the portable device in which it is inserted and in accordance with a set of rules and policies defined in their configuration blocks, restrict or permit the use of functional devices embedded therein and establish filtering rules of data packets that pass through this handheld.

Figure 3:
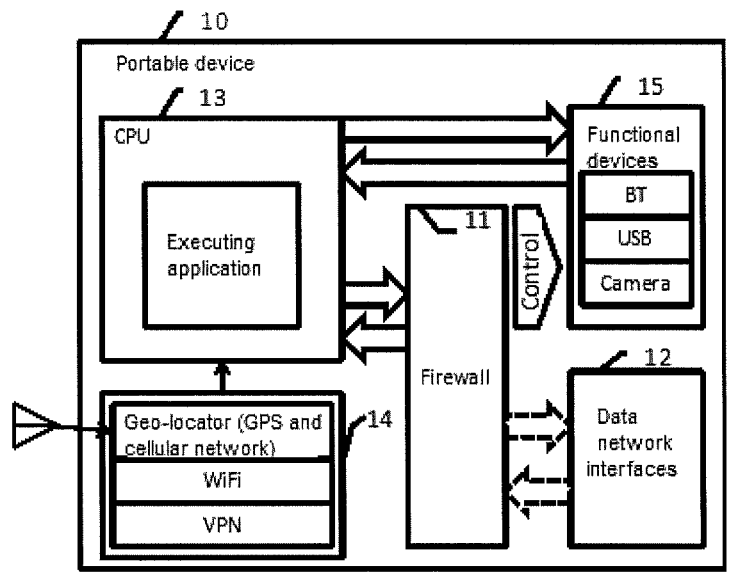
FIG. 3 shows the basic architecture of a portable device and communication of the various blocks of the architecture.

FIG. 3 shows the basic architecture of a portable device 10 and how is the communication of several blocks of this architecture. The Firewall 11 is inserted within this architecture, so that it positioned between the interfaces of Data Networks 12 and CPU 13, which is able to filter which data packets can be sent or received by the portable device 10.

According to the configuration of the firewall filtering rules, it must be able to identify whether a data packet that is being sent by the portable device must be transmitted or dropped. Similarly, the firewall must also be able to determine if a packet arrives at the mobile device should be received or dropped. Data packets can be received for any types of Data Network interfaces 12 such as Wi-Fi, Bluetooth, Zigbee, or through a cellular network using 2G, 3G or 4G.

Firewall must also be able to identify the location of the portable device 10, in which it is inserted so as to apply different settings for different locations. Determining the location of the portable device 10 is by tracking devices 14, these being defined by geo-location devices, detection of Wi-Fi connections and detection of Virtual Private Networks, or VPNs. Geo-location device in accordance with the present invention must include those which define the geographic coordinates of the device in terrestrial surface, which can be done by GPS or by triangulation of signals from cellular base stations. The identification of locations for Wi-Fi is by detecting the proximity of WiFi Access Points previously defined in the Firewall configuration. By performing the comparison of the parameters of Wi-Fi network, as SSID (network ID) or MAC (physical address of the Access Point) with its configuration, the firewall is able to determine the location of the portable device. Finally, an active VPN connection can also be used to determine the location of the portable device 10 and thus apply the rules and policies relating such location. In the latter case, it is considered that the portable device 10 is in the remote location to which it is connected.

In addition to filtering the data packets passing through the portable device 10, the firewall must also control the use of functional devices 15 which are connected to the CPU 13 of device 10. This control is done by the CPU 13 of the portable device 10 that communicates with the Firewall 11 to determine whether, at any given time, certain device can be activated or used. The permissions for activation of functional devices 15 are configured according to the location of the portable device 10 and its configuration.

Figure 4:
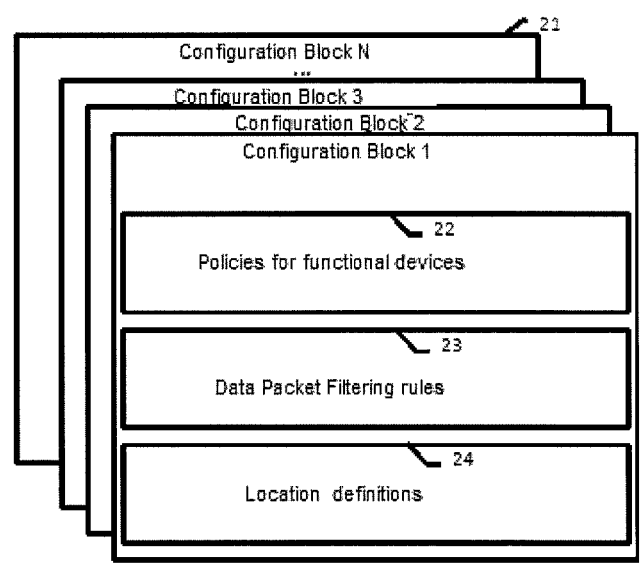
FIG. 4 is a block diagram configuration of the firewall.

FIG. 4 defines how the firewall must be configured and introduces the concept of Configuration Blocks. These blocks define policies for functional devices 15, Rules for Data Packet Filtering and Location Settings. Multiple setting blocks can be defined simultaneously in the Firewall 11, and only one is active at any given time. It is defined which is the active block by the current location of the portable device 10. When a configuration block is active, it reapplies which Filtering rules of Data Packet and Functional devices 15 which can be activated at any given moment.

Figure 5:
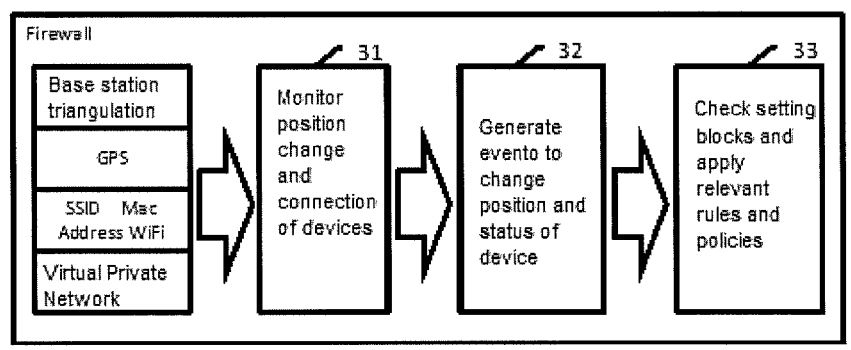
FIG. 5 shows a definition schema of the physical location.

The determination of the location of the portable device 10 is illustrated in FIG. 5. Firewall 11 must constantly monitor the data 31 that indicate their location: geographical location, parameters of Wi-Fi connections and Virtual Private Networks (VPN). Whenever a change in these parameters is identified, an event 32 is generated within Firewall 11, making their configuration blocks to be scanned, searching for a block that describes the same location of the active portable device 10. If it is found, the Filter Rules and Policies of devices of that block 33 will be applied to the portable device 10.

Figure 6:
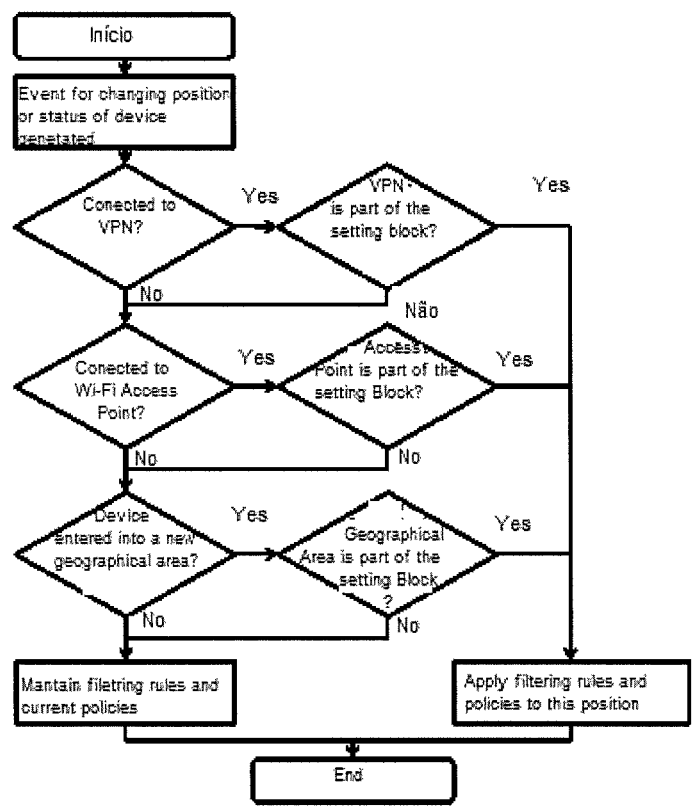
FIG. 6 shows the Decision flow of Change in Position.

Thanks to the variety of parameters that can identify a location in a given time, the portable device 10 can be in multiple locations, which can be defined in more than a block configuration simultaneously. Thus, a priority decision flow needs to be set, as illustrated in FIG. 6. The decisions flow starts whenever an event of change of position is posted on the Firewall 11. The first check is whether the portable device 10 is connected to a Virtual Private Network (VPN). If so, the Firewall VPN 11 checks if this is part of the definition of location of any of the configuration blocks. If so, the rules for Packet Filtering and Policies for functional devices of that block will be applied. Otherwise, the firewall 11 moves to the next parameter in their priority list, defined by a connection to a Wi-Fi network. Again, the Firewall 11 checks whether the portable device 10 is connected to a Wi-Fi network and its parameters SSID or MAC address is part of some of the Firewall Configuration Blocks 11. If so, the settings of that block are applied. If this condition is not verified, the last comparison performed by the Firewall is whether the portable device 10 is within a defined geographic area in any of the configuration blocks. For this to happen, it is only necessary to occur an overlap between the estimated position of the portable device 10 and the geographical areas configured as location in configuration blocks. If so, the settings of the block that contains the current geographical position will be applied, otherwise, the current settings will be maintained until a new event for changing position is generated.

Figure 7:
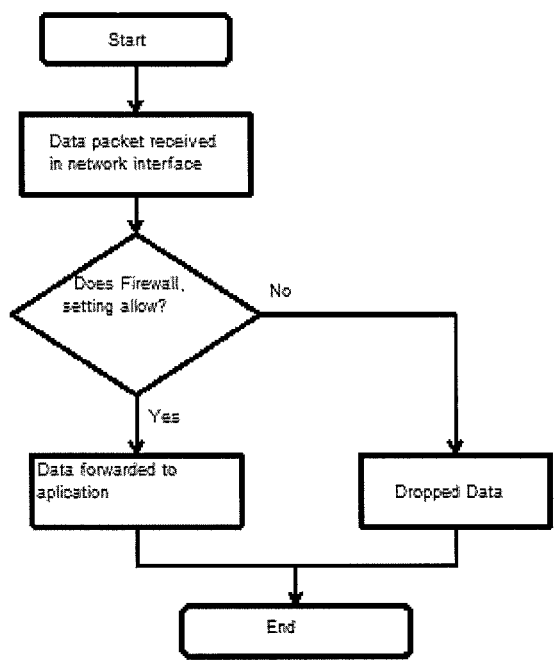
FIG. 7 shows the incoming traffic from the firewall.

Once configured, one of the functions of Firewall 11 is to filter data packets that pass through network interfaces of the portable device. FIG. 7 shows the flow for filtering a data packet received by the device. Going by some of the network interfaces of the portable device 10, the data packet is then checked by the Firewall, which compares the contents of the data packet to its active filtering settings. According to this comparison, the firewall 11 is able to drop the packet, i.e. to block the reception of data or allow that the packet is sent to the application layers.

Figure 8:
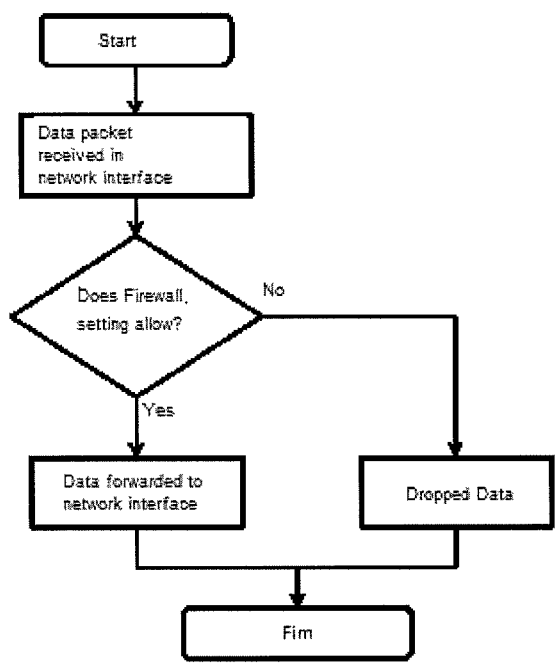
FIG. 8 shows the outgoing traffic firewall.

The same principle applies to the transmission of data packets, according to FIG. 8. Before letting the portable device 10 to be sent to its destination, the data packet has its content checked by the Firewall 11 and compared with their active settings. Again, the Firewall 11 can drop this package, that is, block the transmission of data or allow it to be sent to its recipient.

Figure 9:
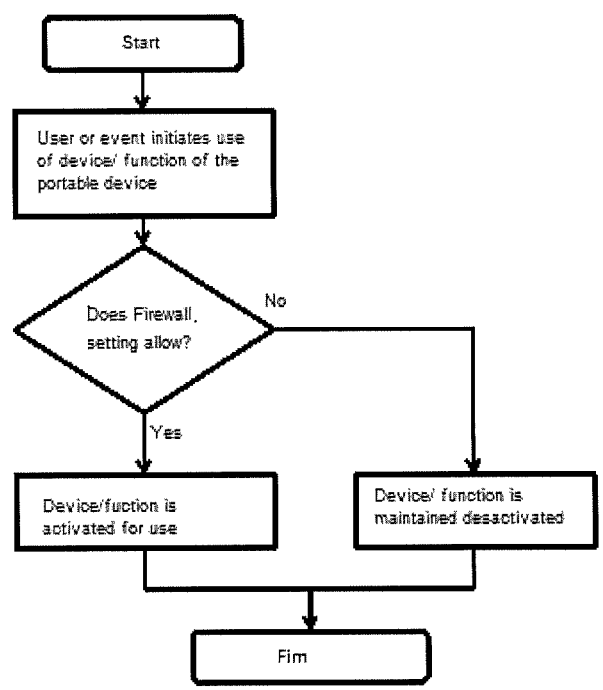
FIG. 9 shows the firewall controlling the use of the devices according to the preferred embodiment of the present invention.

Another control function to be performed by a firewall is to control the use of functional devices 15 which are connected to the portable device 10 according to FIG. 9. Examples of functional devices camera and/or video device, Bluetooth connectivity and USB interface, which features Mass Storage and data transmission can be implemented. The principle of this control is to prevent leakage or capture sensitive information by the portable device 10 when in specific locations.

When the user of the portable device 10 initiates the use of a device 15 controlled by Functional Firewall 11, the CPU 13 of device 10 notifies the Firewall 11 requesting permission to use this device 15. Firewall 11 then checks in its active configuration block which is the current permission for such a device 10. If the configuration does not allow its use, the firewall 11 to the CPU 13 responds to block using the device 15. Otherwise, the answer is positive and the CPU 13 can proceed with the enablement of the device 15. This dependence of the CPU 13 with respect to the Firewall 11 is dependent on the architecture on which the Firewall is implemented. In some cases, where this dependence is impossible or inefficient, the Firewall 11 can implement a system for checking the status of those devices 15 and so requesting the CPU 13 to disable or enable the device 15 according to its active settings whenever a change the state of the device 15 is detected.

Although a preferred embodiment of the present invention is shown and described, those skilled in the art will understand that various modifications can be made without departing from the scope and spirit of the present invention as defined in the appended claims. It is explicitly mentioned that also all combinations of elements that perform the same function in substantially the same way to achieve the same results are within the scope of the invention.

The invention claimed is:

1. A system for the protection of data flow and control of applications and use of a portable device configured by a location, the system comprising:
the portable device; and
a firewall inserted into a basic architecture of the portable device between a Data Network interface and a CPU, the system configured to:
identify whether a data packet being sent by the portable device should be forwarded or discarded;
determine whether a data packet arriving at the portable device should be received or dropped in accordance with a set of rules and policies defined in configuration blocks;
restrict or permit use of functional devices embedded in or connected to the portable device; and
determine filtering rules of the data packets to apply different settings for different locations of the portable device.

2. The system of claim 1, wherein the data packet may be received by interfaces comprising Wi-Fi, Bluetooth, or Zigbee, or by a cellular network using 2G, 3G, or 4G technologies.

3. The system of claim 1, wherein the location of the portable device is determined through a geo-location, detection of a Wi-Fi network, or detection of a connection to a Virtual Private Network (VPN) that define geographic coordinates of the device.

4. The system of claim 3, wherein the geographic coordinates of the device may be defined by GPS or by triangulation of signals from cellular base stations.

5. The system of claim 3, wherein the identification of locations for Wi-Fi networks is performed by detecting the proximity of Wi-Fi Access Points previously defined in the firewall configuration.

6. The system of claim 3, wherein by making a comparison of parameters of Wi-Fi networks, the system is able to determine the location of the portable device.

7. The system of claim 3, wherein an active VPN connection can be also used to determine the location of the portable device.

8. The system of claim 1, further comprising controlling the use of functional devices which are connected to the CPU of the device, by the CPU of the portable device that communicates with the Firewall to determine whether, at any given time, a given functional device may or may not be activated or used, and the permissions for the activation of functional devices configured in accordance with the location of the portable device and its configuration.

9. The system of claim 1, wherein the system constantly monitors the data that indicates the location, and whenever a change is identified in the data, an event is generated within the Firewall, making their configuration blocks to be checked, searching for a block that describes the same location of the active portable device, and if the block is found, the Filtering Rules and Policies of the devices of the block will be applied on the portable device.

10. The system of claim 1, wherein flow of decisions is started whenever an event of change of position is posted on the firewall, a first check is done if the portable device is connected to a Virtual Private Network (VPN), a Wi-Fi network, or geographical position.

11. The system of claim 1, wherein, once configured, one function of the firewall is to filter the data packets passing through the network interface of the portable device.

12. The system of claim 1, wherein, when entering the network interface of the portable device, the data packet is then checked by the firewall, which compares the contents of the data packet to the active firewall filtering settings and, depending on this comparison, the packet is dropped or the package is allowed to be sent to application layers.

13. The system of claim 1, wherein, when sending data packets, before the data packet is sent to a destination, content of the data packet is verified by the firewall and compared to active filtering settings of the firewall, and the data packet may be dropped or sent to the recipient, depending on the active filtering settings.

14. The system of claim 1, wherein the use of functional devices that are attached to or embedded to the portable device are controlled, avoiding leakage or capture of sensitive information from the portable device, at specific locations.

15. The system of claim 1, wherein the settings of firewall policies, which can be used to enable or disable features of the devices, are remotely configured.

* * * * *